United States Patent
Nagase et al.

(10) Patent No.: US 9,638,560 B2
(45) Date of Patent: May 2, 2017

(54) CALIBRATION METHOD AND FLOW RATE MEASUREMENT METHOD FOR FLOW RATE CONTROLLER FOR GAS SUPPLY DEVICE

(75) Inventors: Masaaki Nagase, Osaka (JP); Nobukazu Ikeda, Osaka (JP); Yohei Sawada, Osaka (JP); Tooru Hirai, Osaka (JP); Kazuyuki Morisaki, Osaka (JP); Kouji Nishino, Osaka (JP); Ryousuke Dohi, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 478 days.

(21) Appl. No.: 13/813,219

(22) PCT Filed: Jun. 28, 2011

(86) PCT No.: PCT/JP2011/003679
§ 371 (c)(1),
(2), (4) Date: Apr. 8, 2013

(87) PCT Pub. No.: WO2012/014375
PCT Pub. Date: Feb. 2, 2012

(65) Prior Publication Data
US 2013/0186471 A1 Jul. 25, 2013

(30) Foreign Application Priority Data
Jul. 30, 2010 (JP) .................................. 2010-171626

(51) Int. Cl.
*G01F 1/34* (2006.01)
*G01F 7/00* (2006.01)
(Continued)

(52) U.S. Cl.
CPC ................ *G01F 7/005* (2013.01); *G01F 1/34* (2013.01); *G01F 15/002* (2013.01);
(Continued)

(58) Field of Classification Search
CPC ........ G05D 7/0652; G01F 1/34; G01F 7/0005
(Continued)

(56) References Cited

U.S. PATENT DOCUMENTS

2006/0081045 A1* 4/2006 Robertson ...................... 73/222
2008/0017105 A1 1/2008 Moriya et al.
(Continued)

FOREIGN PATENT DOCUMENTS

EP 1 847 812 A1 10/2007
JP 08-247827 A 9/1996
(Continued)

OTHER PUBLICATIONS

International Search Report issued in corresponding application PCT/JP2011/003679, completed Jul. 19, 2011 and mailed Aug. 2, 2011.

*Primary Examiner* — Michael A Lyons
*Assistant Examiner* — Alexander Mercado
(74) *Attorney, Agent, or Firm* — Griffin and Szipl PC

(57) ABSTRACT

In a gas supply device supplying many different gases to a gas use portion through many flow rate controllers, a flow rate controller calibration unit includes a build-up tank with inner volume, an inlet side on-off valve and an outlet side on-off valve $V_2$ of the tank, and a gas pressure detector and a gas temperature detector for gas inside the tank, joined in a branched form to a gas supply line, with the valve $V_2$ connected to vacuum. The calibration unit is used to calibrate a flow rate controller based on performing a first measurement of gas temperature and pressure inside the tank, and then building-up gas into the tank, and then performing a second measurement of gas temperature and pressure, and from respective measured values, calculating gas flow rate Q and by comparing a set gas flow rate and calculated gas flow rate Q, performing flow rate calibration.

3 Claims, 6 Drawing Sheets

(51) Int. Cl.
*G01F 15/00* (2006.01)
*G01F 25/00* (2006.01)
*G05D 7/06* (2006.01)

(52) U.S. Cl.
CPC ........ *G01F 15/005* (2013.01); *G01F 25/0053* (2013.01); *G05D 7/0652* (2013.01); *Y10T 137/0324* (2015.04)

(58) Field of Classification Search
USPC ................................. 73/1.16; 702/47; 137/2
See application file for complete search history.

(56) References Cited

U.S. PATENT DOCUMENTS

| | | | |
|---|---|---|---|
| 2009/0019943 A1* | 1/2009 | Ozawa et al. | 73/861 |
| 2009/0146089 A1 | 6/2009 | Moriya et al. | |
| 2009/0183548 A1* | 7/2009 | Monkowski et al. | 73/1.35 |
| 2010/0125424 A1* | 5/2010 | Ding et al. | 702/47 |
| 2014/0083159 A1* | 3/2014 | Nagai | 73/1.34 |

FOREIGN PATENT DOCUMENTS

| | | |
|---|---|---|
| JP | 2003-065814 A | 3/2003 |
| JP | 2006-337346 A | 12/2006 |
| JP | 2007-214406 A | 8/2007 |
| JP | 2009-145986 A | 7/2009 |
| WO | 2005/123236 A1 | 12/2005 |
| WO | 2006/075406 A1 | 7/2006 |
| WO | 2007/102319 A1 | 9/2007 |

\* cited by examiner

Build-up volume: 1.0996 L
Time: 10 sec.

(Cv value: 0.1)

CALIBRATION METHOD AND FLOW RATE MEASUREMENT METHOD FOR FLOW RATE CONTROLLER FOR GAS SUPPLY DEVICE

This is a National Phase Application in the United States of International Patent Application No. PCT/JP2011/003679 filed Jun. 28, 2011, which claims priority on Japanese Patent Application No. 2010-171626, filed Jul. 30, 2010. The entire disclosures of the above patent applications are hereby incorporated by reference.

TECHNICAL FIELD OF THE INVENTION

The present invention relates to an improvement in a calibration method and a flow rate measurement method for a flow rate controller of a gas supply device, such as is to be used in a semiconductor manufacturing apparatus and in a drug production apparatus, etc., and specifically, to a calibration method and a flow rate measurement method for a flow rate controller for a gas supply device, which enables more accurate and rapid flow rate calibration and flow rate measurement in a short time.

BACKGROUND OF THE INVENTION

Including Art

A gas supply device of a semiconductor manufacturing apparatus, etc., is generally configured to switch and supply a large variety of gases to an object that uses the gas, such as a process chamber, and a gas (the flow rate of which is controlled by a flow rate controller provided for each kind of supply gas) is supplied to an object that uses the gas. The flow rate calibration and flow rate measurement of each flow rate controller is performed at appropriate time intervals generally by a build-up method (or rate of pressure rise (ROR) method). Thus, flow rate calibration of the flow rate controller is performed by comparing a set flow rate of the flow rate controller with an actual control flow rate measured by the build-up method, etc., and flow rate measurement for obtaining a flow rate from the measured value by the build-up method, etc., is performed.

FIG. 12 and FIG. 13 relate to examples of conventional calibration methods of a flow rate controller for a gas supply device. That is, in the calibration method corresponding to the system shown in FIG. 12, first, a flow rate calibration unit U including a build-up tank BT with a certain inner volume, an inlet on-off valve $V_1$, an outlet on-off valve $V_2$, a pressure detector Pd, and a gas temperature detector Td, is joined to a gas supply line L in a branched form Ls. Next, for example, to calibrate a flow rate controller $MFC_1$ of a gas supply device GF, first, on-off valves $V_{02}$, $V_{0n}$, and $V_0$ are closed and on-off valves $V_{01}$, $V_1$, and $V_2$ are opened to distribute the gas into the tank BT. Also, a pressure detected value $P_1$ and a temperature detected value $T_1$ when the on-off valves $V_1$ and $V_2$ are opened, or at a time $t_1$ after the on-off valve $V_2$ is closed, are measured. Next, the on-off valve $V_2$ is closed, and $\Delta t$ seconds later, or $\Delta t$ seconds after the time $t_1$, a pressure detected value $P_2$ and a temperature detected value $T_2$ are measured.

Then, from the measured values $P_1$, $P_2$ and $T_1$, $T_2$, a rate of pressure rise $\Delta P/\Delta t$ is obtained, a flow rate Q is calculated based on $Q=(\Delta P/\Delta t)\times(V/RT)$, and based on the calculated value, it is judged whether the flow rate control value of the flow rate controller $MFC_1$ is proper. The flow rate calculation formula is for arithmetically calculating a build-up flow rate into the tank BT on the assumption that the gas is an ideal gas, and V is an inner volume of the build-up tank BT, R is a gas constant, and T is a gas temperature inside the tank BT.

On the other hand, in the calibration method according to the system shown in FIG. 13, a flow rate calibration unit U' from which the build-up tank is omitted is joined to a gas supply line L in a branched form Ls. Then, for example, to calibrate the flow rate controller $MFC_1$ of the gas supply device GF, first, on-off valves $V_0$, $V_{00}$, $V_{02}$, and $V_{0n}$ are closed and on-off valves $V_{01}$, $V_1$, and $V_2$ are opened to supply the gas at a set flow rate from the flow rate controller $MFC_1$ to the flow rate calibration unit U', and then, the on-off valve $V_2$ is closed. After the on-off valve $V_2$ is closed, when the pressure detected value of the pressure detector Pd reaches $P_1$, a first measurement is performed to measure the pressure $P_1$ and temperature $T_1$. Thereafter, when the pressure detected value of the pressure detector Pd reaches $P_2$ (or when a set time of t seconds elapses), a second measurement is performed to measure the pressure $P_2$ and temperature $T_2$.

In addition, by arithmetically calculating a sum V of a pipe passage inner volume Ve of the portion of the gas supply lines L and Ls from the on-off valve $V_{00}$, the on-off valve $V_{01}$, the on-off valve $V_{02}$, and the on-off valve $V_{0n}$ on the upstream side of the flow rate calibration unit U' to the on-off valve $V_1$, and an inner volume Vt of the pipe passage between the on-off valve $V_1$ and the on-off valve $V_2$ of the flow rate calibration unit U' based on a rate of pressure rise $\Delta P/\Delta t$ obtained by the same measurement method as in the case of FIG. 12, and the flow rate value Q of the flow rate controller $MFC_1$ at that time and the flow rate formula $Q=(\Delta P/\Delta t)\times(V/RT)$, the total pipe passage inner volume V is obtained in advance.

Then, from the measured values, a gas absolute flow rate $Q_0$ at a temperature of 0° C. at 1 atm from the flow rate controller $MFC_1$ is obtained based on the relationship between the inflow mass dG and an elapsed (inflow) time dt of the gas. That is, the inflow mass dG can be expressed by $dG=r_0 \cdot Q_0 \cdot dt$ (provided that dt is an elapsed (inflow) time and $r_0$ is a specific weight). Based on the pressures P and temperatures T measured by the first measurement and the second measurement, an ideal gas has a relationship of PV=nRT, and by substituting the mass G for the mole number n, the relationship of PV=GRT is established.

Therefore, on the assumption that the gas pressure $P_1$, gas temperature $T_1$, gas mass $G_1$ are measured by the first measurement, and the gas pressure $P_2$, gas temperature $T_2$, and gas mass $G_2$ are measured by the second measurement, the difference in mass G (inflow mass dG) is expressed by $dG=G_2-G_1=P_1/T_1 \cdot V/R - P_2/T_2 \cdot V/R = (P_1/T_1 - P_2/T_2) \cdot V/R \ldots$ Formula (I). From the above-described formula $dG=r_0 \cdot Q_0 \cdot dt$, the absolute flow rate $Q_0$ of the gas can be calculated by $Q_0=(P_1/T_1-P_2/T_2) \cdot V/R \cdot 1/r_0$, and based on the calculated value $Q_0$, it is judged whether the flow rate control performance of the flow rate controller $MFC_1$ is proper.

In view of the method corresponding to the system shown in FIG. 13, the objectives of the present invention are (1) to reduce errors of the calculated reference flow rate by using a coefficient that is a compression factor in Formula (1) described above since application of the ideal gas equation becomes difficult depending on the kind of gas, and (2) to determine the timing to start the second measurement after the first measurement based on a pressure rise value when the control flow rate is in the range of 1000 SCCM to 2000 SCCM, or based on an elapsed time when the control flow rate is in the range of 2 SCCM to 1000 SCCM.

The method according to the system shown in FIG. 13 has a technical idea common to the present invention in regard to obtaining the flow rate Q from the inflow mass dG. However, the method corresponding to the system shown in FIG. 13 and the present invention have factors different from each other that determine the time (timing) to start the second measurement. That is, the present invention is different in technical idea from the method of the system of FIG. 12 in that, basically, the second measurement is performed after the gas temperature $T_2$ inside the build-up tank BT reaches, after the gas is building-up, a constant value near the gas temperature $T_1$ before the building-up of gas in the build-up tank BT.

In the method using the build-up tank BT shown in FIG. 12, by reducing the heat capacity of the thermocouple that is the temperature detector Td (e.g., by thinning the thermocouple), detection of the gas temperature inside the tank BT has become more accurate than conventionally known. However, the method has problems that (1) the measured value of the gas temperature inside the tank BT significantly fluctuates according to the attaching position of the temperature detector Td to the build-up tank BT, (2) the gas temperature T during rise of the gas pressure inside the tank significantly fluctuates in actuality and does not become a constant temperature T, and (3) when a temperature change of the outside air is large, the gas temperature during pressure detection changes and fluctuation of the temperature detected value T increases, and even if the gas is close to an ideal gas, the reliability of the calculated value of the flow rate Q is low.

In the method corresponding to the system shown in FIG. 13, without providing a build-up tank BT whose inner volume is known in the flow rate calibration unit U', by regarding the inner volume V of the pipe passage between the outlet of the flow rate controller $MFC_1$ and the downstream side on-off valve $V_2$ of the flow rate calibration unit U' as equivalent to the inner volume of the build-up tank, the flow rate is arithmetically calculated. Therefore, for flow rate calibration, first, the pipe passage inner volume V must be calculated, and it is troublesome to perform flow rate calibration of the flow rate controller MFC (whether $MFC_1$, $MFC_2$, $MFC_n$), and in addition, measurement errors relating to the temperature T, the pressure P and the time t and a measurement error relating to the pipe passage inner volume V are added to the control flow rate calculated value, so that the control flow rate operation accuracy significantly deteriorates.

PRIOR ART DOCUMENT

Patent Document

Patent Document 1: Japanese Published Unexamined Patent Application No. 2006-337346
Patent Document 2: International Publication No. WO 2007/102319

SUMMARY OF THE INVENTION

Problems to be Solved by the Invention

The present invention solves the above-described problems in the conventional calibration method and flow rate measurement method for a flow rate controller according to the build-up or ROR method, that is, (1) in a method in which a control flow rate is calibrated based on the rate of pressure rise $\Delta P/\Delta t$ and the time $\Delta t$ by using the build-up tank whose inner volume is known in advance, an arithmetic calculation error of the flow rate is unavoidably caused by fluctuation of the gas temperature during pressure rise, and (2) in the method in which a flow rate Q is arithmetically calculated by obtaining a difference $\Delta G$ in gas mass that flowed into a pipe passage whose total inner volume is V at a constant time interval $\Delta t$ when a gas is supplied at a steady flow rate into the pipe passage whose total inner volume is V, the pipe passage inner volume V must be obtained by some method first, so that, as compared with the case of using the build-up tank BT whose inner volume is known, the calculation of the pipe passage inner volume V is overly troublesome.

Means for Solving the Problems

The inventors of the present invention acquired knowledge that, from the flow rate calibration method for a flow rate controller by the conventional build-up (or ROR) method, (1) in order to reduce the number of operations for arithmetically calculating the pipe passage inner volume V and the error of the flow rate calculated value based on an arithmetic calculation error of the inner volume V, use of the build-up tank with an inner volume V that was known in advance and appropriate was essential, and (2) by rapidly closing the inlet side on-off valve of the build-up tank after a pressure rise according to building-up, the gas temperature inside the tank BT rapidly returned to a constant temperature close to an indoor temperature.

Based on the information acquired by the inventors, the inventors of the present invention conceived that higher-accurate flow rate calibration of a flow rate controller was enabled by arithmetically calculating the inflow mole number (inflow mass G) of the gas into the build-up tank BT from the gas pressures and gas temperatures before and after building-up, and accurately controlling the build-up time and the time to close the inlet side on-off valve of the build-up tank BT after completion of building-up by using an on-off valve that is capable of opening and closing at a high speed (for example, a solenoid valve), and performing the second measurement when the gas temperature inside the tank after building-up becomes close to the gas temperature inside the tank before building-up. The inventors conducted many flow rate calibration tests based on this concept.

A calibration method according to the present invention was developed based on the test results of the above-described flow rate calibration tests, and an invention according to a first non-limiting illustrative embodiment is basically constructed so that, in a gas supply device that supplies a plurality of kinds of gases to a gas use portion in a switchable manner through each of the flow rate controllers, respectively, a flow rate controller calibration unit 5, including a build-up tank BT with an inner volume V, an inlet side on-off valve $V_1$ and outlet side on-off valve $V_2$ of the tank BT, and a gas pressure detector Pd and a gas temperature detector Td for gas inside the tank BT, is joined in a branched form to a gas supply line L of the gas supply device, and the outlet side on-off valve $V_2$ of the flow rate controller calibration unit 5 is connected to a vacuum exhaust system, and first, outlet side on-off valves $V_{01}$ to $V_{0n}$ of each of the flow rate controllers of the flow rate control device and an inlet on-off valve $V_0$ of the gas use portion are closed and the outlet side on-off valve $V_2$ and inlet side on-off valve $V_1$ of the calibration unit 5 are opened, and next, only the outlet side on-off valve of a flow rate controller to be calibrated is opened to flow the gas into the calibration unit 5 at a set flow rate, and at the time at which the gas pressure and the gas temperature inside the tank become stable, first measurement of the gas temperature $T_0$ and the gas pressure $P_0$ inside the tank is performed, and then, at a time $t_0$, the outlet side on-off valve $V_2$ of the calibration unit 5 is closed and building-up of the gas into the tank BT is performed, and then, at the time $t_1$, the inlet side on-off valve $V_1$ is closed, and at a time $t_2$ after the inlet side on-off valve $V_1$ is closed, a second measurement of the gas temperature $T_2$ and the gas pressure $P_2$ is performed, and from the respective measured values, the gas flow rate Q is arithmetically calculated based on $Q=(22.4V/R \cdot \Delta t) \times (P_2/T_2 - P_0/T_0)$ (provided that V is the inner volume of the tank BT, R is a gas constant, $\Delta t$ is a build-up time $t_1-t_0$), and by comparing the set gas flow rate and the operated gas flow rate Q, flow rate calibration of the flow rate controller to be calibrated is performed.

A flow rate measurement method according to the present invention is basically construed so that, in a method for measuring a flow rate of a flow rate controller that controls a fluid flowing from a fluid supply source, the flow rate measurement method includes a build-up tank BT with an inner volume V on the downstream of the flow rate controller, an inlet side on-off valve $V_1$ and an outlet side on-off valve $V_2$ disposed on the inlet side and the outlet side of the tank BT, and a gas pressure detector Pd and a temperature detector Td disposed inside the tank BT, and consists of a step of making gas flow into the tank BT by opening the inlet side on-off valve $V_1$ and the outlet side on-off valve $V_2$ in a state where a fluid flows from the flow rate controller, a step of measuring a gas pressure $P_0$ and a gas temperature $T_0$ when the gas pressure and the gas temperature become stable, a step of filling the gas into the tank BT by closing only the outlet side on-off valve $V_2$ at the time $t_0$, a step of closing the inlet side on-off valve $V_1$ at the time $t_1$, a step of keeping the inlet side on-off valve $V_1$ and the outlet side on-off valve $V_2$ closed until the time $t_2$ after the time $t_1$, a step of measuring a gas temperature $T_2$ and a gas pressure $P_2$ again while the inlet side on-off valve $V_1$ and the outlet side on-off valve $V_2$ are closed, and a step of arithmetically calculating a gas flow rate Q based on the respective measurement results, as $Q=(22.4V/R \cdot \Delta t) \times (P_2/T_2 - P_0/T_0)$ (provided that V is the inner volume of the tank BT, R is a gas constant, $\Delta t$ is a build-up time $t_1-t_0$).

EFFECTS OF THE INVENTION

In accordance with the present invention, the second measurement by the flow rate controller calibration unit is performed not after completion of building-up (that is, the closing point $t_1$ of the inlet side on-off valve $V_1$) but at the time $t_2$ after a predetermined time elapses since the closing point $t_1$ of the inlet side on-off valve $V_1$. As a result, at the time $t_2$ of the second measurement, the gas temperature $T_2$ inside the build-up tank BT lowers to a temperature extremely close to the gas temperature To (that is, the indoor temperature) inside the tank before building-up, so that there is no large difference between the gas temperature $T_0$ that is the result of the first measurement and $T_2$ that is the result of the second measurement, and as compared with a conventional build-up method in which arithmetic operations (calculations) are performed by assuming that the temperature T during pressure rise is constant, more accurate flow rate calibration can be realized.

In accordance with the present invention, a build-up tank BT whose inner volume is known in advance is used, so that, unlike the conventional method in which an operated flow rate is obtained from data of the first and second measurements, it is not necessary to measure the inner volume of the gas supply line in advance or simultaneously. As a result, flow rate calibration can be extremely easily performed, and even if the inner volume of the gas supply line changes according to a change in configuration of the gas supply device, without receiving any effect therefrom, flow rate calibration of the flow rate controller can still be rapidly performed.

DETAILED DESCRIPTION OF THE INVENTION

Best Mode for Carrying Out the Invention

Figure 1:
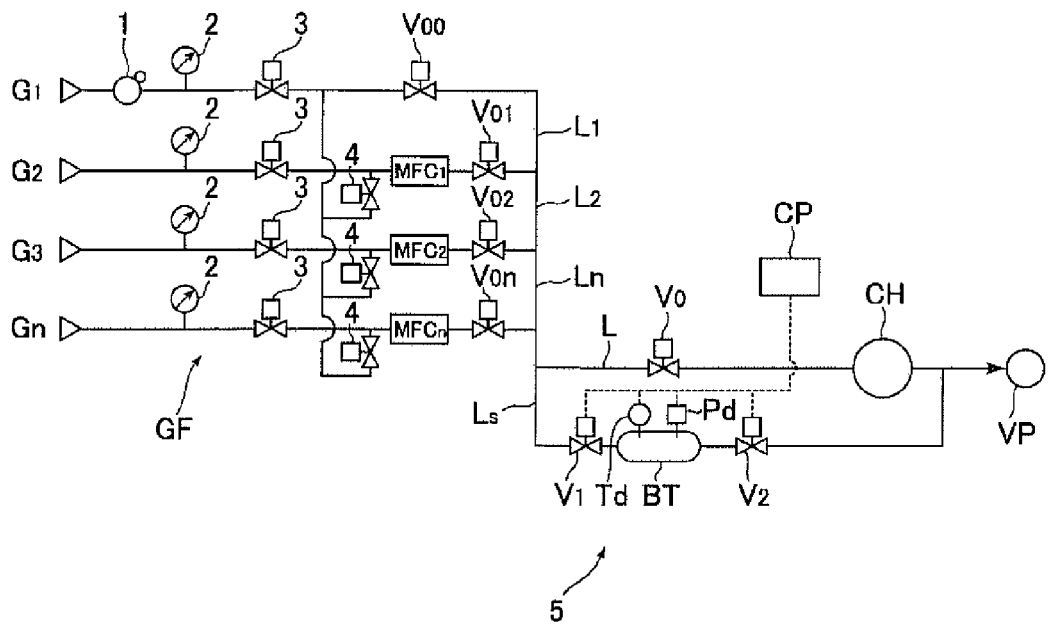
FIG. 1 is a schematic view of a system for carrying-out a calibration method for a flow rate controller according to the present invention.

FIG. 1 is a schematic diagram illustrating a system corresponding to a first embodiment of a calibration method for a flow rate controller for a gas supply device according to the present invention, and shows flow rate calibration of a flow rate controller MFC provided in a gas supply device GF. In FIG. 1, GF denotes a gas supply device, $MFC_1$, $MFC_2$ to $MFC_n$ denote flow rate controllers, $G_1$ to $G_n$ denote supply gases, L, $L_1$ to $L_n$ and $L_n$ denote gas supply lines, $V_{00}$, $V_{01}$, $V_{02}$, to $V_{0n}$ denote on-off valves, $V_0$ denotes an on-off valve, $V_1$ and $V_2$ denote on-off valves, CH denotes a process chamber, VP denotes a vacuum pump, Td denotes a temperature detector, Pd denotes a pressure detector, BT denotes a build-up tank, 1 denotes a pressure regulator, 2 denotes a pressure gauge, 3 and 4 denote valves, 5 denotes a flow rate controller calibration unit, and CP denotes an arithmetic operation control section, and a predetermined gas is switched and supplied from the gas supply device GF to the process chamber CH through the gas supply line L and the valve $V_0$.

The flow rate controller calibration unit 5 is formed of the build-up tank BT, the inlet side on-off valve $V_1$, the outlet side on-off valve $V_2$, and the pressure detector Pd and the temperature detector Td provided in the tank BT, etc., and is connected to the gas supply line L via the gas supply flow line Ls in a branched form. Respective detection outputs of the pressure detector Pd and the temperature detector Td and control signals of the on-off valve $V_1$ and the on-off valve $V_2$ of the flow rate controller calibration unit 5 are input into the arithmetic operation control section CP, and arithmetic operation (calculation) of a gas flow rate value and flow rate calibration and arithmetic operation and indication, etc., of flow rate control accuracy are performed as described later.

First, the inventors of the present invention investigated how the gas temperature inside the tank BT, which increased the gas pressure according to building-up, changed when the inlet side on-off valve $V_1$ was closed after building-up.

That is, in the embodiment shown in FIG. 1, a reference flow rate controller was attached instead of the flow rate controller $MFC_1$ and first, the on-off valves $V_{00}$, $V_{02}$, $V_{0n}$, and $V_0$ were closed and the on-off valves $V_1$ and $V_2$ were opened to distribute $N_2$ gas for a predetermined period of time at a flow rate of 500 SCCM (Standard Cubic Centimeters per Minute), and after stabilizations of the flow rate, pressure, and temperature of the $N_2$ gas were confirmed, the outlet side on-off valve $V_2$ was closed to perform building-up for 10 seconds, and immediately after this, the inlet side on-off valve $V_1$ was closed and the changing state of gas temperature inside the build-up BT was observed. As the flow rate controller, one with a capacity of 100 SCCM and 1 SLM (Standard Liter per Minute) made by Fujikin Incorporated was used, and the inner volume V of the build-up BT was set to 1.0996 liters (known). The gas flow rate ($N_2$) was set to 500 SCCM, and the build-up time was set to 10 seconds. Furthermore, the outside air temperature (indoor temperature) was 21.7° C.

Figure 2:
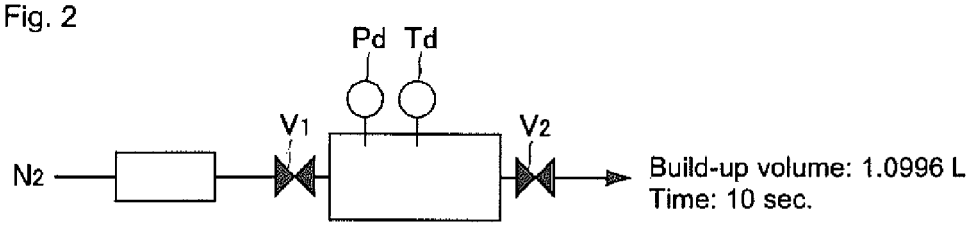
FIG. 2 is a diagram showing curves of the changing state of gas temperature and gas pressure, etc., inside a build-up tank.
Figure 2:
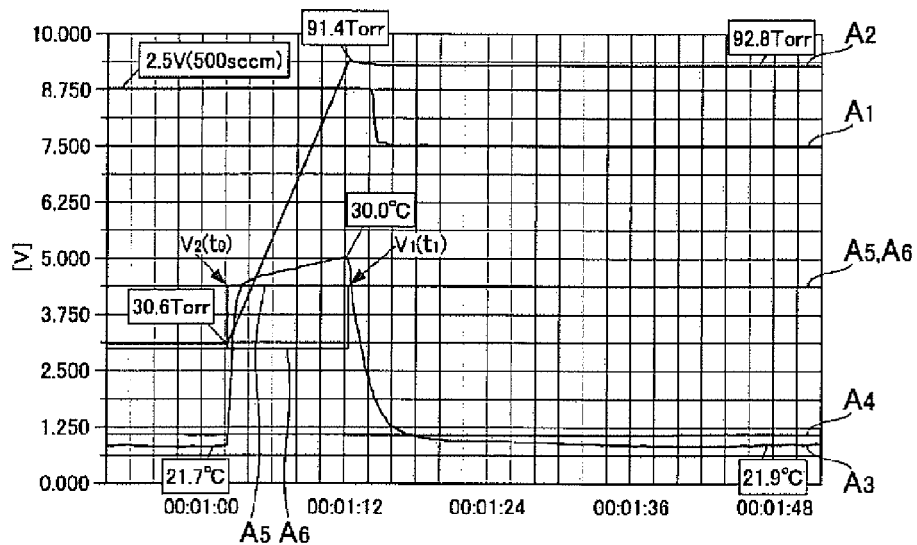

FIG. 2 shows the changing state of gas temperature and gas pressure, etc., inside the build-up tank BT in the build-up tests, and the curve $A_1$ indicates the flow rate output of the flow rate controller, the curve $A_2$ indicates the pressure detected value inside the tank BT, the curve $A_3$ indicates the gas temperature detected value inside the tank BT, the curve $A_4$ indicates the outside air temperature (indoor temperature), the curve $A_5$ indicates the control signal for the output side on-off valve $V_2$, and the curve $A_6$ indicates the control signal for the inlet side on-off valve $V_1$. As the pressure detector Pd, a (Baratron) capacitance manometer TYPE 627D (1000 Torr F.S.) made by MKS Instruments was used. As the temperature detector Td, a thermocouple (wire type) with a diameter of 2.5 mm was used, and as a measuring instrument, a data logger NR-500 made by KEYENCE CORPORATION was used.

Specifically, as shown in FIG. 2, when the outlet side on-off valve $V_2$ is closed and building-up is started at the point $t_0$, the gas pressure inside the tank increases from 30.6 Torr to 94.1 Torr at the point $t_1$. At the point $t_1$, by rapidly closing the inlet side on-off valve $V_1$, the gas temperature inside the tank rapidly lowers to 21.9° C. (indoor temperature: approximately 22° C.).

As is clear from the above-described test results, it was confirmed that by rapidly closing the inlet side on-off valve $V_1$ after building-up, the gas temperature inside the tank rapidly lowered to the indoor temperature, so that by arithmetically calculating a gas inflow mass by performing a first measurement when the outlet side on-off valve $V_2$ of the tank BT is closed (when starting building-up) (the time $t_0$) and a second measurement at the time $t_2$ after a predetermined time (approximately 1 to 300 seconds that differs depending on the kind of the gas, the tank volume, and the gas flow rate, etc.,) elapses since completion of building-up (closing of the inlet side on-off valve $V_1$), a more accurate gas flow rate from which the influence of gas temperature change during building-up is eliminated can be arithmetically calculated. The reason for this is that the gas temperatures inside the tank BT at the time $t_0$ and the time $t_2$ become constant values substantially close to the indoor temperature, and an arithmetic operation error due to gas temperature changes before and after building-up does not occur.

Figure 3:
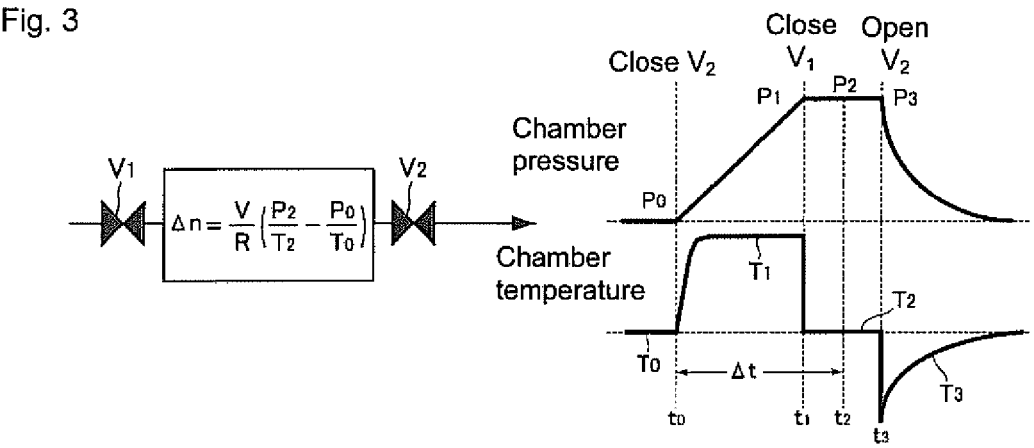
FIG. 3 is a diagram schematically showing results of FIG. 2.

FIG. 3 schematically shows the test results shown in FIG. 2, and the outlet side on-off valve $V_2$ is closed and the first measurement is performed at the time $t_0$, the inlet side on-off valve $V_1$ is closed at the time $t_1$, the second measurement is performed at the time $t_2$, and the outlet side on-off valve $V_2$ is opened at a time $t_3$. When the mole number $\Delta n$ of the gas that flowed in during building-up:

$$\Delta n = \frac{V}{R}\left(\frac{P_2}{T_2} - \frac{P_O}{T_O}\right) \qquad \text{[Numerical formula 1]}$$

is converted into a gas volume $V_G$ in a standard state (0° C., 1 atm), the following result:

$$V_G = \frac{22.4V}{R}\left(\frac{P_2}{T_2} - \frac{P_O}{T_O}\right) \qquad \text{[Numerical formula 2]}$$

is obtained, and the gas flow rate Q into the tank BT can be calculated as:

$$Q = \frac{\Delta V_G}{\Delta t} = \frac{22.4V}{R\Delta t}\left(\frac{P_2}{T_2} - \frac{P_O}{T_O}\right) \qquad \text{[Numerical formula 3]}$$

Here, $\Delta t$ is the build-up time, and $\Delta t = t_1 - t_0$.

First Embodiment

Referring to FIG. 1 and FIG. 2, to perform flow rate calibration of the flow rate controller of the gas supply device GF, first, the flow rate controller calibration unit 5 is connected to the gas supply line L in a branched form Ls. Next, to calibrate the flow rate controller $MFC_1$, the on-off valves $V_{00}$, $V_{02}$, $V_{0n}$, and $V_0$ are closed and the on-off valves $V_{01}$, $V_1$, and $V_2$ are opened to supply a gas flow at a set flow rate Qs from the flow rate controller $MFC_1$ to the calibration unit 5, and the gas is exhausted by the vacuum pump VP.

Next, when the gas temperature $T_0$ and the gas pressure $P_0$ inside the build-up tank BT of the calibration unit 5 become stable, at the time $t_0$, gas building-up is started by closing the outlet side on-off valve $V_2$ and the gas temperature $T_0$ and the gas pressure $P_0$ inside the tank are detected and input into the arithmetic operation control section CP. When building-up of the gas into the tank BT proceeds and the gas pressure reaches the set value $P_1$ (or the set time $t_1$ is reached), the inlet side on-off valve $V_1$ is rapidly closed.

Furthermore, when the set time determined in advance (approximately 1 to 300 seconds that differs depending on the kind of gas, the tank volume, and the gas flow rate, etc.,) elapses since rapid closing (i.e., time $t_1$) of the inlet side on-off valve $V_1$ and then the time $t_2$ is reached, the pressure $P_2$ and the temperature $T_2$ inside the tank BT are detected and the detected values are input into the arithmetic operation control section CP. When the second pressure and temperature detection at the time $t_2$ is finished, simultaneously with this or at the time $t_3$, the outlet side on-off valve $V_2$ is opened to exhaust the gas inside the tank BT.

On the other hand, in the arithmetic operation control section CP, the flow rate Q is arithmetically calculated by using the detected values $P_0$, $T_0$, $P_2$, and $T_2$, and the build-up time $\Delta t$ ($\Delta t = t_1 - t_0$), and the set flow rate Qs of the flow rate controller $MFC_1$ and the calculated flow rate Q are compared, and based on predetermined standards, a judgment of flow rate control performance of the flow rate controller $MFC_1$ and calibration, etc., are performed.

By performing the above-described calibration operation for each of the flow rate controllers $MFC_1$ to $MFC_n$, the flow rate controllers of the gas supply device GF are calibrated. In other words, the calibration operation described above may be performed separately for each of the flow rate controllers $MFC_1$ to $MFC_n$.

Table 1 shows test results when a flow rate controller to be tested was a calibrated flow rate controller, and shows temperature and pressure measured values before building-up (first measurement, time $t_0$), immediately after building-up (time $t_1$), and at the time of second measurement (time $t_2$), and calculated values of the gas inflow rate Q and the flow rate error % R.D. in time $\Delta t$.

Figure 4:
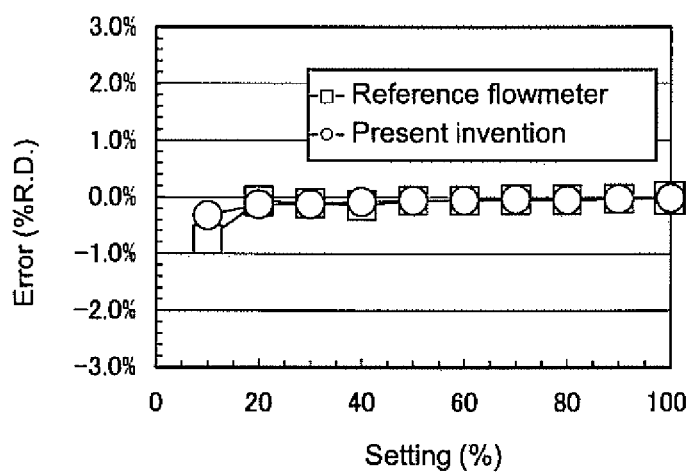
FIG. 4 is a diagram showing a relationship between the set flow rate of a flow rate controller using a build-up tank BT whose inner volume is 1.0996 liters and the error % R.D., and showing a relationship between the set flow rate and the error % R.D. in the case of using the method according to the present invention and those in the case of using a calibrated reference flowmeter.

FIG. 4 compares the flow rate errors % R.D. (circles) of the flow rate controller obtained by the build-up method according to the present invention shown in Table 1 above and flow rate errors % R.D. (squares) of a flow rate controller obtained by using a flow rate controller to be calibrated (hereinafter, referred to as flow rate controller T1000) that was adjusted by a calibrated flow rate controller, etc., described later as a reference flowmeter. FIG. 4 shows that the flow rate errors % R.D. are smaller in the case of flow rate calibration by the build-up method according to the present invention than in the case of using the flow rate controller T1000 as a reference flowmeter regardless of the volume of the set flow rate of the flow rate controller to be measured.

Table 2 shows differences between flow rate errors % R.D. in the case where the flow rate controller to be measured was calibrated by the build-up method according to the present invention and flow rate errors % R.D. in the case where the flow rate controller T1000 was used as a reference flowmeter by which calibration was performed.

TABLE 2

Tank volume: 1.1120 L

| Setting | Reference flowmeter | % R.D. | Present invention | % R.D. | Difference |
|---|---|---|---|---|---|
| 100 | 99.98 | −0.02% | 99.98 | −0.02% | 0.00% |
| 90 | 89.98 | −0.03% | 89.97 | −0.03% | −0.01% |
| 80 | 79.96 | −0.05% | 79.96 | −0.05% | 0.00% |
| 70 | 69.97 | −0.05% | 69.97 | −0.04% | 0.01% |
| 60 | 59.96 | −0.06% | 59.96 | −0.06% | 0.00% |
| 50 | 49.97 | −0.07% | 49.97 | −0.06% | 0.01% |
| 40 | 39.94 | −0.15% | 39.96 | −0.09% | 0.06% |
| 30 | 29.97 | −0.11% | 29.96 | −0.13% | −0.02% |
| 20 | 19.99 | −0.07% | 19.97 | −0.13% | −0.06% |
| 10 | 9.93 | −0.74% | 9.97 | −0.33% | 0.41% |

Figure 5:
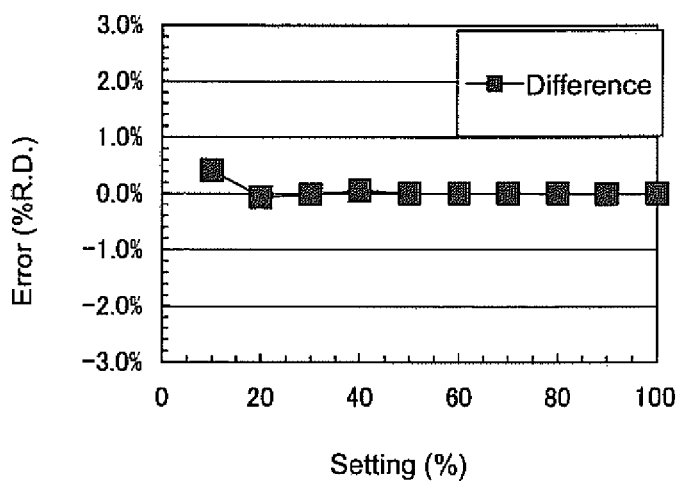
FIG. 5 is a diagram showing a relationship between the set flow rate of the flow rate controller and the error % R.D. in a second embodiment using a build-up tank whose inner volume is 120.36 cc.

FIG. 5 is a graph of the error differences shown in Table 2 above, and shows that the calibration method according to the present invention realizes highly-accurate flow rate calibration even in a region in which the set flow rate is as small as 100 SCCM or less.

Table 3 shows test results of a second embodiment of the present invention, and shows measured and operated values when a chamber with an inner diameter of 20 mmφ (inner volume: 170.36 cc) was used as the build-up tank BT, a 0.25 μm thermocouple was used as the temperature detector Td, a pressure detector Pd having a capacity of 100 Torr was used, and high-speed on-off valves with a Cv value of 0.1 were used as the inlet side on-off valve $V_1$ and the outlet side on-off valve $V_2$.

TABLE 1

Tank volume: 1.1120 L

| Reference flow rate SCCM | Build-up time sec. | Indoor temperature ° C. | Before build-up Pressure Torr | Before build-up Temperature ° C. | After build-up Pressure Torr | After build-up Temperature ° C. | Calculated flow rate SCCM | Error % R.D. |
|---|---|---|---|---|---|---|---|---|
| 100 | 20 | 21.38 | 0.43 | 22.34 | 25.07 | 22.32 | 99.99 | 0.01% |
| 100 | 20 | 21.30 | 0.44 | 22.30 | 25.08 | 22.30 | 99.98 | 0.00% |
| 100 | 20 | 21.27 | 0.44 | 22.28 | 25.07 | 22.25 | 99.87 | 0.00% |
| 80 | 20 | 21.37 | 0.44 | 22.26 | 20.14 | 22.25 | 79.97 | 0.00% |
| 80 | 20 | 21.40 | 0.44 | 22.25 | 20.14 | 22.30 | 79.95 | −0.01% |
| 80 | 20 | 21.30 | 0.44 | 22.20 | 20.14 | 22.27 | 79.96 | 0.00% |
| 60 | 20 | 21.11 | 0.44 | 22.15 | 15.21 | 22.24 | 59.96 | 0.00% |
| 60 | 20 | 21.07 | 0.44 | 22.19 | 15.21 | 22.11 | 59.97 | 0.01% |
| 60 | 20 | 21.05 | 0.44 | 22.12 | 15.21 | 22.14 | 59.96 | −0.01% |
| 40 | 20 | 21.36 | 0.44 | 21.99 | 10.28 | 21.91 | 39.97 | 0.07% |
| 40 | 20 | 21.60 | 0.44 | 21.92 | 10.28 | 21.89 | 39.96 | 0.06% |
| 40 | 20 | 21.79 | 0.44 | 21.88 | 10.28 | 21.95 | 39.96 | 0.05% |
| 20 | 20 | 21.08 | 0.44 | 22.06 | 5.36 | 22.11 | 19.97 | −0.09% |
| 20 | 20 | 20.97 | 0.44 | 22.08 | 5.36 | 22.03 | 19.97 | −0.06% |
| 20 | 20 | 21.15 | 0.44 | 21.95 | 5.36 | 21.95 | 19.98 | −0.03% |
| 10 | 20 | 21.21 | 0.44 | 21.95 | 2.90 | 22.00 | 9.97 | 0.44% |
| 10 | 20 | 21.28 | 0.44 | 21.99 | 2.90 | 22.00 | 9.97 | 0.44% |
| 10 | 20 | 21.28 | 0.44 | 21.99 | 2.89 | 21.95 | 9.96 | 0.38% |

TABLE 3

| Reference flow rate SCCM | Build-up time sec. | Indoor temperature ° C. | Before build-up | | After build-up | | Tank volume: 124.66 cc Calculated flow rate SCCM | Error % R.D. |
|---|---|---|---|---|---|---|---|---|
| | | | Pressure Torr | Temperature ° C. | Pressure Torr | Temperature ° C. | | |
| 100.0 | 20 | 21.27 | 0.0 | 21.3 | 218.9 | 21.3 | 99.91 | −0.07% |
| 100.0 | 20 | 21.3 | 0.0 | 21.3 | 219.1 | 21.4 | 100.05 | 0.06% |
| 100.0 | 20 | 21.3 | 0.0 | 21.3 | 219.0 | 21.5 | 99.98 | 0.00% |
| 80.0 | 20 | 21.46 | 0.0 | 21.5 | 175.4 | 21.6 | 80.01 | 0.06% |
| 80.0 | 20 | 21.45 | 0.0 | 21.5 | 175.4 | 21.7 | 80.01 | 0.06% |
| 80.0 | 20 | 21.34 | 0.0 | 21.6 | 175.4 | 21.7 | 80.01 | 0.05% |
| 60.0 | 20 | 21.13 | 0.0 | 21.5 | 131.5 | 21.6 | 60.03 | 0.11% |
| 60.0 | 20 | 21.15 | 0.0 | 21.5 | 131.4 | 21.6 | 60.00 | 0.06% |
| 60.0 | 20 | 21.12 | 0.0 | 21.5 | 131.4 | 21.5 | 60.01 | 0.07% |
| 39.9 | 20 | 21.05 | 0.0 | 21.3 | 87.5 | 21.4 | 39.98 | 0.09% |
| 39.9 | 20 | 21.12 | 0.0 | 21.3 | 87.5 | 21.4 | 39.98 | 0.09% |
| 39.9 | 20 | 21.07 | 0.0 | 21.3 | 87.5 | 21.4 | 39.98 | 0.09% |
| 20.0 | 20 | 21.27 | 0.0 | 21.4 | 43.7 | 21.5 | 20.00 | 0.09% |
| 20.0 | 20 | 21.29 | 0.0 | 21.4 | 43.7 | 21.4 | 20.01 | 0.10% |
| 20.0 | 20 | 21.4 | 0.0 | 21.4 | 43.7 | 21.4 | 20.01 | 0.10% |
| 9.9 | 20 | 21.46 | 0.0 | 21.5 | 21.7 | 21.5 | 9.96 | 0.30% |
| 9.9 | 20 | 21.33 | 0.0 | 21.5 | 21.7 | 21.5 | 9.95 | 0.29% |
| 9.9 | 20 | 21.33 | 0.0 | 21.5 | 21.7 | 21.6 | 9.95 | 0.28% |

Second Embodiment

Figure 6:
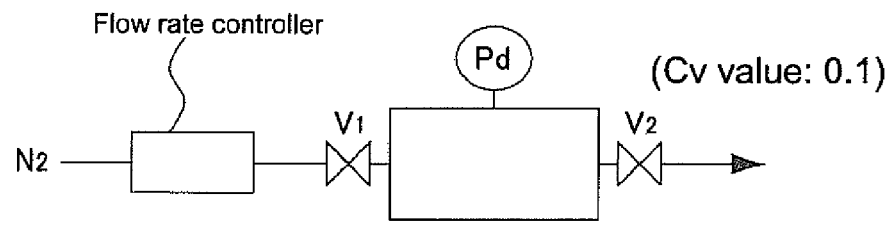
FIG. 6 is a diagram showing a relationship between the set flow rate and the build-up tank internal pressure in the second embodiment of the present invention.
Figure 6:
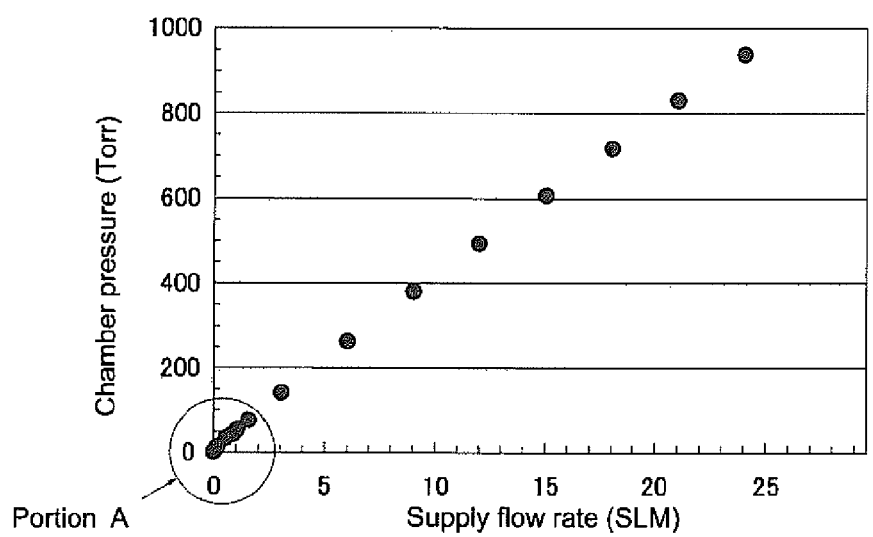
Figure 7:
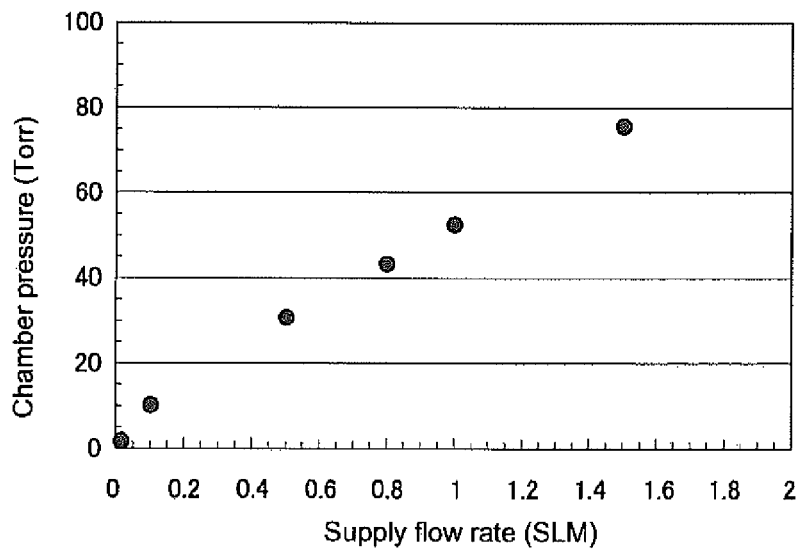
FIG. 7 is an enlarged view of the portion A in FIG. 6.

In the second embodiment, the inner volume of the build-up tank BT is as small as 120.36 cc, so that the relationship between the supply flow rate and the tank internal pressure was investigated first. FIG. 6 shows the investigation results, and FIG. 7 is an enlarged view of the portion A in FIG. 6. As is clear from FIG. 6 and FIG. 7, when the inner volume of the build-up tank BT is approximately 120.36 cc, the internal pressure rises to approximately 100 Torr at a gas supply flow rate of 1.6 SLM (on-off valves $V_1$ and $V_2$ are on-off valves with a Cv value of 0.1). T1000 denotes a flow rate controller to be calibrated that was adjusted by the calibrated flow rate controller, etc.

On the other hand, the flow rate controller to be calibrated may be a thermal type flow rate controller, or a pressure type flow rate controller, and when it is a pressure type flow rate controller, the pressure value of the output side (secondary side) must be 100 Torr or less. Therefore, when the build-up tank volume is 100 to 150 cc, the calibrated flow rate must be 1000 SCCM or less. From these facts, therefore, in the test shown in Table 3, the set flow rate of the flow rate controller to be measured is set to 100 SCCM to 10 SCCM.

Figure 8:
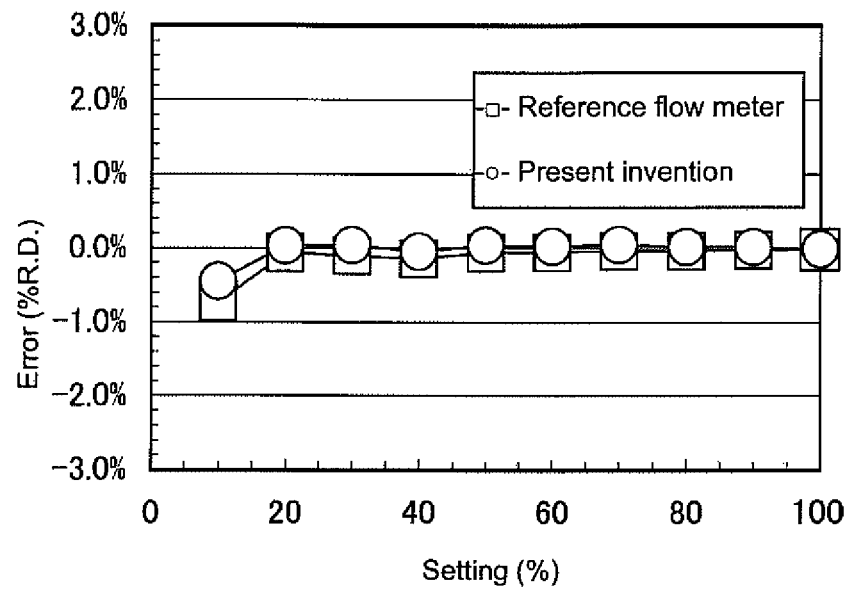
FIG. 8 is a diagram showing comparison between flow rate errors % R.D. in the case of the second embodiment of the present invention and flow rate errors % R.D. in the case where a calibrated flow rate controller is used as a reference flowmeter.

FIG. 8 compares flow rate errors % R.D. for calibration by the build-up method according to the present invention, as shown in Table 3 given above, and flow rate errors % R.D. for calibration as in the case of using the flow rate controller T1000 as a reference flowmeter. From FIG. 8, it was proven that both of these calibration methods were in substantially the same range of the flow rate error % R.D.

Table 4 shows differences between flow rate errors % R.D. in the case where the flow rate controller to be calibrated was calibrated according to the present invention and flow rate errors % R.D. in the case where the flow rate controller T1000 was used as a reference flow rate controller, and measurement was performed.

TABLE 4

Tank volume: 124.66 cc

| Setting | Reference flowmeter | % R.D. | Present invention | % R.D. | Difference |
|---|---|---|---|---|---|
| 100 | 99.98 | −0.02% | 99.98 | −0.02% | 0.00% |
| 90 | 89.98 | −0.03% | 90.01 | 0.01% | 0.04% |
| 80 | 79.96 | −0.05% | 80.01 | 0.01% | 0.06% |
| 70 | 69.97 | −0.05% | 70.03 | 0.04% | 0.09% |
| 60 | 59.96 | −0.06% | 60.01 | 0.02% | 0.08% |
| 50 | 49.97 | −0.07% | 50.02 | 0.03% | 0.10% |
| 40 | 39.94 | −0.15% | 39.98 | −0.05% | 0.09% |
| 30 | 29.97 | −0.11% | 30.01 | 0.03% | 0.15% |
| 20 | 19.99 | −0.07% | 20.01 | 0.03% | 0.10% |
| 10 | 9.93 | −0.74% | 9.95 | −0.45% | 0.29% |

Figure 9:
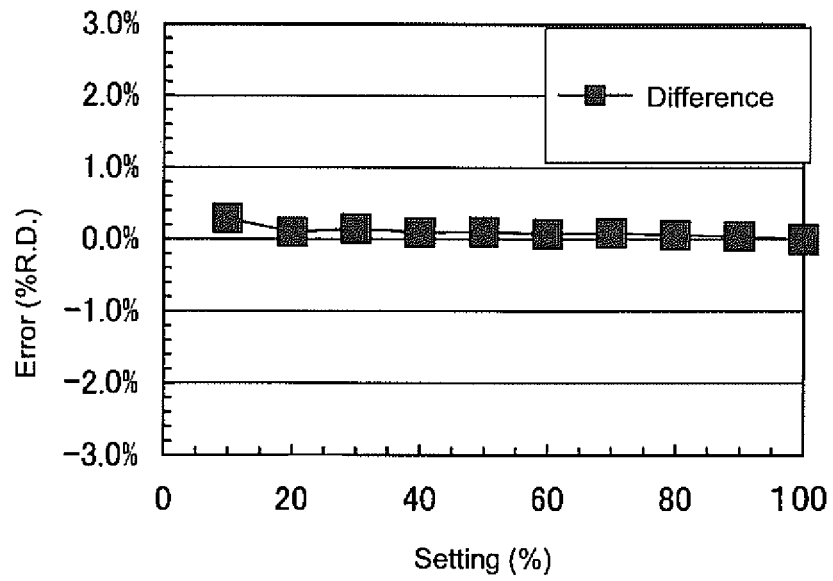
FIG. 9 is a diagram showing a relationship between the set flow rate in Table 4 and the difference in flow rate measurement error % R.D. between the case of the method according to the present invention and the case where a calibrated flow rate controller is used as a reference flowmeter.

FIG. 9 shows the relationship between the set flow rate of the flow rate controller to be calibrated and the difference in flow rate error % R.D. between the case of using the flow rate controller T1000 and the case of the present invention in Table 4 given above. FIG. 9 shows that the difference in flow rate error % R.D. does not significantly change as a result of the set flow rate.

Table 5 shows a relationship among the set flow rate (close to 10 SCCM, and 100 SCCM) of the flow rate controller to be calibrated and the flow rate error % R.D. The longer the build-up time Δt, the smaller the error % R.D.

TABLE 5

Tank volume: 1.1120 L

| Setting | Reference flowmeter | % R.D. | Present invention | % R.D. | Difference |
|---|---|---|---|---|---|
| 100.5 | 100.48 | −0.02% | 100.55 | 0.05% | 0.07% |
| 100 | 99.98 | −0.02% | 100.00 | 0.00% | 0.02% |
| 99.5 | 99.48 | −0.02% | 99.51 | 0.01% | 0.03% |
| 10.5 | 10.45 | −0.47% | 10.47 | −0.33% | 0.14% |
| 10 | 9.95 | −0.50% | 9.95 | −0.47% | 0.02% |
| 9.5 | 9.45 | −0.52% | 9.46 | −0.47% | 0.06% |

Figure 10:
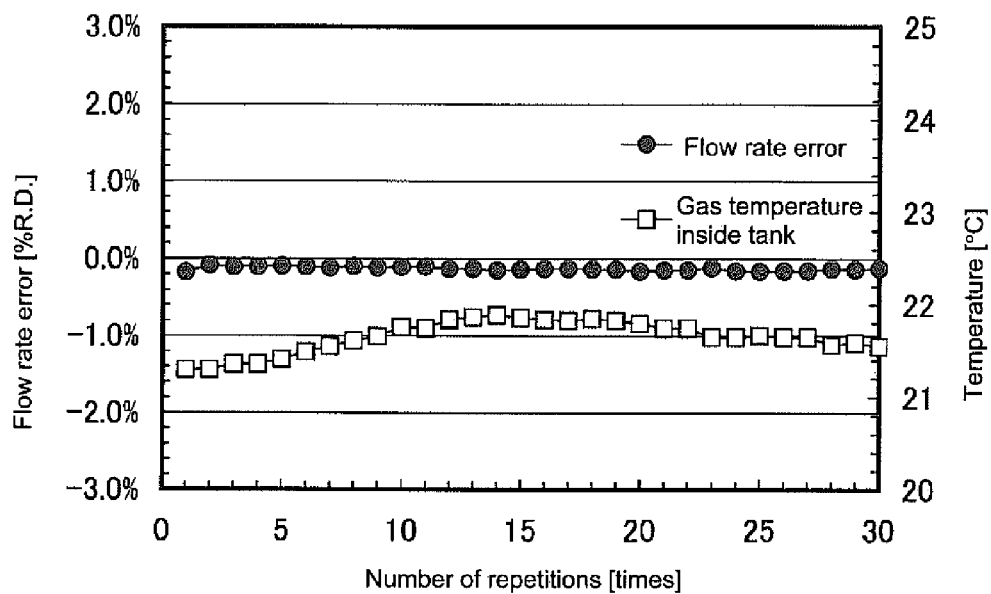
FIG. 10 is a diagram showing results of repeated measurement tests (repeated 30 times at 5-minute intervals) in the second embodiment of the present invention.

Table 6 shows results of calibration and measurement repeated 30 times at intervals of five minutes, when T1000 adjusted by a calibrated flow rate controller was used as the flow rate controller to be calibrated, $N_2$ gas was supplied at 100 SCCM into the build-up tank with a volume of 120.36 cc, and the build-up time $\Delta t = t_1 - t_2$ was set to 7.5 sec. FIG. 10 is a graph diagram of the data shown in Table 6, and the black circles indicate a flow rate error % R.D., the white squares indicate a gas temperature (° C.) inside the tank.

TABLE 6

| | Temperature ° C. | Q SCCM | Error % R.D. |
|---|---|---|---|
| 1 | 21.30 | 99.81 | −0.18% |
| 2 | 21.30 | 99.90 | −0.09% |
| 3 | 21.36 | 99.87 | −0.11% |
| 4 | 21.36 | 99.88 | −0.11% |
| 5 | 21.41 | 99.88 | −0.10% |
| 6 | 21.49 | 99.88 | −0.11% |
| 7 | 21.55 | 99.86 | −0.12% |
| 8 | 21.61 | 99.88 | −0.10% |
| 9 | 21.66 | 99.86 | −0.12% |
| 10 | 21.76 | 99.88 | −0.11% |
| 11 | 21.75 | 99.88 | −0.10% |
| 12 | 21.84 | 99.85 | −0.13% |
| 13 | 21.87 | 99.85 | −0.13% |
| 14 | 21.89 | 99.83 | −0.15% |
| 15 | 21.86 | 99.84 | −0.14% |
| 16 | 21.84 | 99.85 | −0.13% |
| 17 | 21.83 | 99.85 | −0.13% |
| 18 | 21.85 | 99.84 | −0.14% |
| 19 | 21.83 | 99.84 | −0.14% |
| 20 | 21.80 | 99.82 | −0.16% |
| 21 | 21.75 | 99.83 | −0.15% |
| 22 | 21.75 | 99.83 | −0.15% |
| 23 | 21.65 | 99.86 | −0.12% |
| 24 | 21.65 | 99.82 | −0.16% |
| 25 | 21.67 | 99.82 | −0.17% |
| 26 | 21.65 | 99.82 | −0.16% |
| 27 | 21.65 | 99.82 | −0.16% |
| 28 | 21.57 | 99.85 | −0.13% |
| 29 | 21.59 | 99.84 | −0.14% |
| 30 | 21.55 | 99.86 | −0.13% |

As is clear from FIG. 10, the flow rate error % R.D. in the calibration test is at a substantially constant value.

TABLE 7

| | | Flow rate (SCCM) | | | | |
|---|---|---|---|---|---|---|
| | | 10 | 50 | 100 | 500 | 1000 |
| Base pressure (Torr) | | 2.7 | 7.0 | 10.6 | 31.0 | 52.8 |
| Volume (cc) | 10 | 7.7 | 1.5 | 0.71 | 0.11 | 0.04 |
| | 50 | 38.4 | 7.3 | 3.5 | 0.54 | 0.19 |
| | 100 | 76.8 | 14.7 | 7.1 | 1.1 | 0.37 |
| | 200 | 153.6 | 29.4 | 14.1 | 2.2 | 0.75 |
| | 1000 | 768.2 | 146.8 | 70.6 | 10.9 | 3.7 |

Table 7 shows the relationship obtained by actual measurement between the volume of the build-up tank BT and the actual time until the tank internal pressure of 100 Torr is reached from the gas base pressure $P_0$. Table 7 shows that the range from 10 to 100 SCCM of the set flow rate and from 10 to 200 cc of the inner volume is an applicable range from the viewpoint of the build-up time.

Similarly, Table 8 shows the relationship obtained by actual measurement among the inner volume cc of the build-up tank BT, the set flow rate of the gas, the base pressure $P_0$ of the gas, and the rate of pressure rise (Torr/sec) of the gas inside the tank BT. As evident from Table 8, in a general gas supply device (gas box) for a semiconductor manufacturing apparatus, from the viewpoint of the actual set flow rate of the flow rate controller to be calibrated, the build-up time $\Delta t$, and the installation location, etc., it was found that 50 to 200 cc was an optimum inner volume of the build-up tank BT.

TABLE 8

| | | Flow rate (SCCM) | | | | |
|---|---|---|---|---|---|---|
| | | 10 | 50 | 100 | 500 | 1000 |
| Base pressure (Torr) | | 2.7 | 7.0 | 10.6 | 31.0 | 52.8 |
| Volume (cc) | 10 | 12.67 | 63.3 | 126.7 | 633.3 | 1266.7 |
| | 50 | 2.53 | 12.7 | 25.3 | 126.7 | 253.3 |
| | 100 | 1.27 | 6.3 | 12.7 | 63.3 | 126.7 |
| | 200 | 0.63 | 3.2 | 6.3 | 31.7 | 63.3 |
| | 1000 | 0.13 | 0.6 | 1.3 | 6.3 | 12.7 |

Third Embodiment

Figure 11:
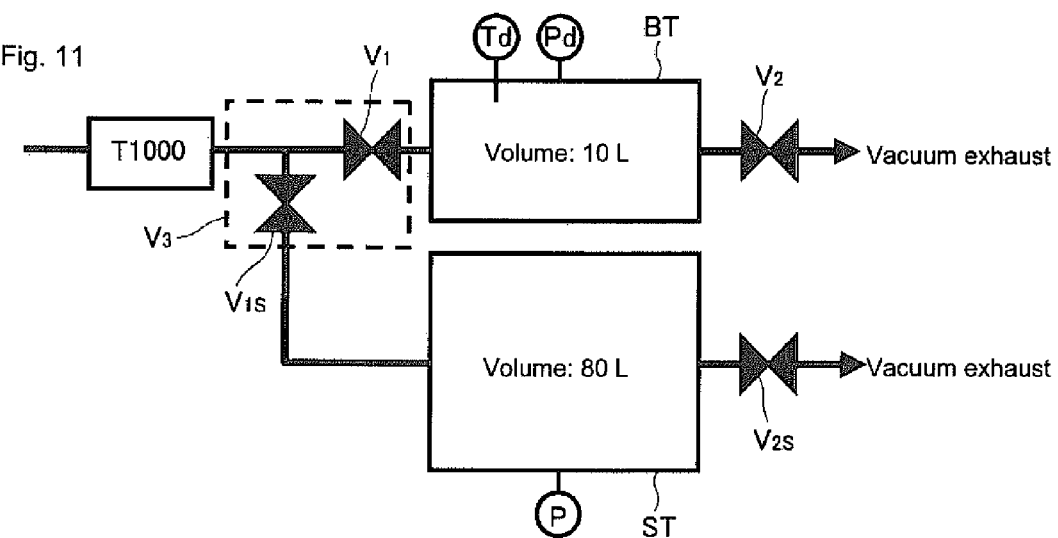
FIG. 11 is a schematic diagram of a third embodiment of the present invention.
Figure 12:
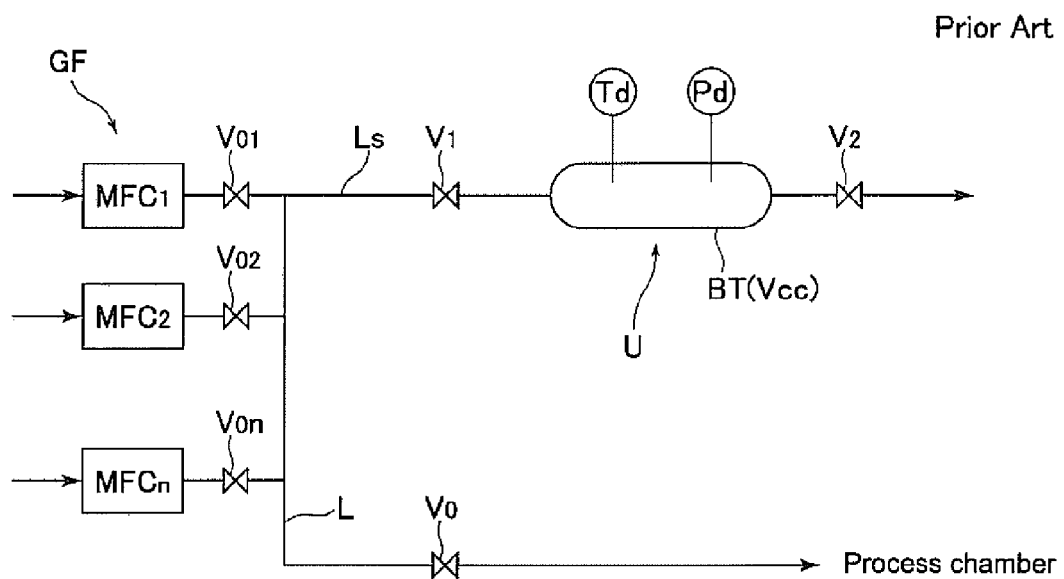
FIG. 12 is a schematic diagram of a system used to perform a flow rate calibration method according to a conventional build-up method.
Figure 13:
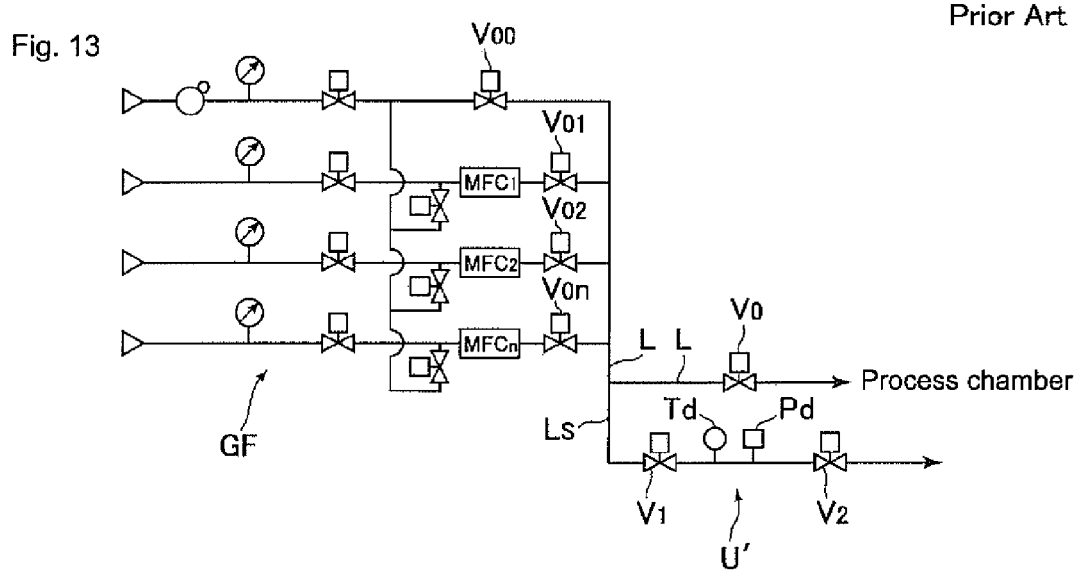
FIG. 13 is a schematic diagram of a system used to perform a flow rate calibration method according to another conventional build-up method.

FIG. 11 is a system diagram of a flow rate controller calibration unit to be used in a third embodiment of the present invention, and T1000 denotes a flow rate controller to be calibrated that was adjusted by a calibrated flow rate controller, etc., $\Delta T$ denotes a waste chamber, $V_1$ denotes an inlet side on-off valve of the build-up chamber BT, $V_{1S}$ denotes an inlet side on-off valve of the waste chamber, and $V_{2S}$ denotes an outlet side on-off valve of the waste chamber. As a matter of course, it is permissible that the inlet side on-off valves $V_1$ and $V_{1S}$ are replaced by a dual three-way valve $V_3$ and the dual three-way valve is used instead.

For flow rate calibration and flow rate measurement of the flow rate controller, gas must continuously flow for a pre-determined period of time until its flow rate, pressure, and temperature become stable from a vacuum state, and it takes a long time until the gas becomes stable. In addition, if the gas flow rate is high, for example, when the gas flows at several to several tens of SLM, problems occur in terms of the cost of gas consumption and exhaust gas treatment facilities, etc. Therefore, the flow rate controller calibration unit is provided with a waste chamber ST as shown in FIG. 11, and flow rate calibration and flow rate measurement are performed by the following operations.

First, the outlet side on-off valve $V_2$ of the build-up chamber BT and the outlet side on-off valve $V_{2S}$ of the waste chamber ST are both opened to vacuum the insides of the chambers BT and ST. At this time, as a matter of course, the inlet side on-off valve $V_1$ and the inlet side on-off valve $V_{1S}$ on the upstream side are closed. In the present embodiment, 10 liters is selected as the inner volume of the build-up chamber BT, and 80 liters is selected as the inner volume of the waste chamber ST.

Next, both the outlet side on-off valves $V_2$ and $V_{2S}$ are closed, the inlet side on-off valve $V_1$ of the build-up chamber BT is closed, and the inlet side on-off valve $V_{1S}$ of the waste chamber ST is opened to supply the gas into the waste chamber ST through the flow rate controller T1000. When the state of the gas supplied through the flow rate controller T1000 stabilizes, the inlet side on-off valve $V_{1S}$ of the waste chamber ST is closed and the inlet side on-off valve $V_1$ of the build-up chamber BT is opened, and the first measurement described in the aforementioned embodiment is started. During the necessary first measurement, the outlet side on-off valve $V_{2S}$ of the waste chamber ST is opened to gradually exhaust the gas inside the waste chamber ST.

Thereafter, the inlet side on-off valve $V_1$ of the build-up chamber BT is closed and the temperature is kept so as to be stable, and then the necessary second measurement described in the aforementioned embodiment is performed. During this time, the gas inside the waste chamber ST is gradually exhausted as well. Thereafter, the outlet side on-off valve $V_2$ of the build-up chamber BT is opened to gradually exhaust the gas inside the chamber, and after the gas pressure inside the waste chamber ST lowers to a certain degree, the gas is then exhausted at once (i.e., suddenly) and the state inside the chamber restores to the initial state as it was before the measurement.

In accordance with a first illustrative non-limiting embodiment of the present invention, a calibration method for a flow rate controller for a gas supply device is provided, wherein the gas supply device supplies a plurality of kinds of gases to a gas use portion in a switchable manner through each of the flow rate controllers, respectively, wherein a flow rate controller calibration unit 5 including a build-up tank BT with an inner volume V, an inlet side on-off valve $V_1$ and an outlet side on-off valve $V_2$ of the tank BT, and a gas pressure detector Pd and a gas temperature detector Td for gas inside the tank BT is joined in a branched form to a gas supply line L of the gas supply device, and the outlet side on-off valve $V_2$ of the flow rate controller calibration unit 5 is connected to a vacuum exhaust system. The calibration method then includes, first, closing outlet side on-off valves $V_{01}$ to $V_{0n}$ of each of the flow rate controllers of the flow rate control device and an inlet on-off valve $V_0$ of the gas use portion, and opening the outlet side on-off valve $V_2$ and inlet side on-off valve $V_1$ of the calibration unit 5, and next, only the outlet side on-off valve of a flow rate controller to be calibrated is opened to flow the gas into the calibration unit 5 at a set flow rate, and at a time at which the gas pressure and the gas temperature inside the tank stabilize, a first measurement of the gas temperature $T_0$ and the gas pressure $P_0$ inside the tank is performed, and then, at a time $t_0$, the outlet side on-off valve $V_2$ of the calibration unit 5 is closed and building-up of the gas into the tank BT is performed, and then, at a time $t_1$, the inlet side on-off valve $V_1$ is closed, and at a time $t_2$ after the inlet side on-off valve $V_1$ is closed, a second measurement of the gas temperature $T_2$ and the gas pressure $P_2$ is performed, and from the respective measured values, a gas flow rate Q is arithmetically calculated based on $Q=(22.4V/R\cdot\Delta t)\times(P_2/T_2-P_0/T_0)$, wherein V is the inner volume of the tank BT, R is a gas constant, $\Delta t$ is a build-up time $t_1-t_0$, and by comparing the set gas flow rate and the calculated gas flow rate Q, flow rate calibration of the flow rate controller to be calibrated is performed. In accordance with a second non-limiting illustrative embodiment of the present invention, the first non-limiting embodiment is modified so that the gas supply device is a gas box for a semiconductor manufacturing apparatus, and the calibration unit 5 is provided inside the gas box.

In accordance with a third non-limiting illustrative embodiment of the present invention, a flow rate measurement method is provided that includes, in a method for measuring a flow rate of a flow rate controller that controls a fluid flowing from a fluid supply source, a build-up tank BT with an inner volume V on the downstream of the flow rate controller, an inlet side on-off valve $V_1$ and an outlet side on-off valve $V_2$ disposed on the inlet side and the outlet side of the tank BT, and a gas pressure detector Pd and a temperature detector Td disposed inside the tank BT, wherein the method comprises: (a) a step of making gas flow into the tank BT by opening the inlet side on-off valve $V_1$ and the outlet side on-off valve $V_2$ in a state where a fluid flows from the flow rate controller; (b) a step of measuring a gas pressure $P_0$ and a gas temperature $T_0$ when the gas pressure and the gas temperature stabilize; (c) a step of filling the gas into the tank BT by closing only the outlet side on-off valve $V_2$ at a time $t_0$; (d) a step of closing the inlet side on-off valve $V_1$ at a time $t_1$; (e) a step of keeping the inlet side on-off valve $V_1$ and the outlet side on-off valve $V_2$ closed until a time $t_2$ after the time $t_1$; (f) a step of measuring a gas temperature $T_2$ and a gas pressure $P_2$ again while the inlet side on-off valve $V_1$ and the outlet side on-off valve $V_2$ are closed; and (g) a step of arithmetically calculating a gas flow rate Q based on the respective measurement results, as $Q=(22.4V/R\cdot\Delta t)\times(P_2/T_2-P_0/T_0)$, wherein V is the inner volume of the tank BT, R is a gas constant, $\Delta t$ is a build-up time $t_1-t_0$.

In view of the above non-limiting embodiments of the invention, it is possible to realize a more rapid and more accurate flow rate calibration of a flow rate controller by a build-up (or ROR) method, and to downsize the calibration unit used for calibration. And generally, according to the present invention, in a gas supply device that supplies a plurality of kinds of gases to a gas use portion in a switchable manner through each of the flow rate controllers, respectively, a flow rate controller calibration unit 5 is provided that includes a build-up tank BT with an inner volume V, an inlet side on-off valve $V_1$ and an outlet side on-off valve $V_2$ of the tank BT, and a gas pressure detector Pd and a gas temperature detector Td for gas inside the tank BT, which is joined in a branched form to a gas supply line L of the gas supply device, and the outlet side on-off valve $V_2$ of the calibration unit 5 is connected to a vacuum exhaust system, and, according to the method, first, outlet side on-off valves $V_{01}$ to $V_{0n}$ of each of the flow rate controllers of the flow rate control device and an inlet on-off valve $V_0$ of the gas use portion are closed and the outlet side on-off valve $V_2$ and inlet side on-off valve $V_1$ of the calibration unit 5 are opened, and next, only the outlet side on-off valve of a flow rate controller to be calibrated is opened to flow the gas into the calibration unit 5 at a set flow rate, and at the time $t_0$ at which the gas pressure and the gas temperature inside the tank become stable, a first measurement of the gas temperature $T_0$ and the gas pressure $P_0$ inside the tank is performed, and then, the outlet side on-off valve $V_2$ of the calibration unit 5 is closed and building-up of the gas into the tank BT is performed, and at the time $t_1$, the inlet side on-off valve $V_1$ is closed, and at the time $t_2$ after the inlet side on-off valve $V_1$ is closed, a second measurement of the gas temperature $T_2$ and the gas pressure $P_2$ is performed, and from the respective measured values, the gas flow rate Q is arithmetically calculated based on $Q=(22.4V/R\cdot\Delta t)\times(P_2/T_2-P_0/T_0)$ (provided that V is the inner volume of the tank BT, R is a gas constant, $\Delta t$ is a build-up time $t_1-t_0$), and by comparing the set gas flow rate and the operated gas flow rate Q, flow rate calibration is performed.

INDUSTRIAL APPLICABILITY

The present invention is applicable to calibration tests not only of a gas box for a semiconductor manufacturing apparatus but also of various flow rate controllers for any gas supply devices and flow rate controllers for any gas supply systems.

DESCRIPTION OF REFERENCE SYMBOLS

GF: Gas supply device
$MFC_1$ to $MFC_n$: Flow rate controller
$G_0$ to $G_n$: Supply gas type
L, $L_1$ to $L_n$: Gas supply line $V_{00}$ to $V_{0n}$: On-off valve
CH: Process chamber
VP: Vacuum pump
Td: Temperature detector
Pd: Pressure detector
BT: Build-up tank (build-up chamber)
1: Pressure regulator
2: Pressure gauge
3, 4: On-off valve
5: Flow rate controller calibration unit
CP: Arithmetic operation control section
T1000: Flow rate controller to be calibrated adjusted by calibrated flow rate controller, etc.
ST: Waste chamber
$V_3$: Dual three-way valve
$V_{1S}$: Inlet side on-off valve of waste chamber
$V_{2S}$: Outlet side on-off valve of waste chamber

The invention claimed is:

1. A calibration method for a flow rate controller for a gas supply device that supplies a plurality of kinds of gases to a gas use portion in a switchable manner through each of a plurality of flow rate controllers, respectively, wherein the method comprises the steps of:
    (a) providing a flow rate controller calibration unit that includes a build-up tank provided with an inner volume, a first inlet side on-off valve and a first outlet side on-off valve of the build-up tank, and a gas pressure detector and a gas temperature detector arranged to detect gas pressure and gas temperature for gas inside the build-up tank, wherein the flow rate controller calibration unit is joined in a branched form to a gas supply line of the gas supply device, and the first outlet side on-off valve of the flow rate controller calibration unit is connected to a vacuum exhaust system;
    (b) then first, closing a plurality of second outlet side on-off valves of each of the flow rate controllers of the flow rate control device and closing a second inlet on-off valve of the gas use portion, and the first outlet side on-off valve and the first inlet side on-off valve of the calibration unit are opened;
    (c) and next, only a third outlet side on-off valve of a flow rate controller to be calibrated is opened to flow gas into the calibration unit at a set flow rate, and after the gas flows into the build-up tank, performing a first gas temperature $T_0$ measurement and a first gas pressure $P_0$ measurement inside the build-up tank;
    (d) and then, at a time $t_0$, closing the first outlet side on-off valve of the calibration unit and building-up of gas into the build-up tank is performed;
    (e) and then, at a time $t_1$, closing the first inlet side on-off valve, and at a time $t_2$ when a gas temperature inside the build-up tank after closing of the first inlet side on-off valve becomes essentially the first gas temperature $T_0$ inside the build-up tank before closing of the first inlet side on-off valve, performing a second gas temperature $T_2$ measurement and a second gas pressure $P_2$ measurement, and from the respective measured values of gas pressure and gas temperature, a gas flow rate Q is arithmetically calculated based on $Q=(22.4V/R \cdot \Delta 0 \times (P_2/T_2 - P_0/T_0))$, wherein V is inner volume of the build-up tank, R is a gas constant, $\Delta t$ is a build-up time $t_1 - t_0$; and
    (f) by comparing a set gas flow rate and the calculated gas flow rate Q, a flow rate calibration of the flow rate controller to be calibrated is performed.

2. The calibration method for a flow rate controller for a gas supply device according to claim 1, wherein the gas supply device is a gas box for a semiconductor manufacturing apparatus, and the calibration unit is disposed inside the gas box.

3. A flow rate measurement method including a method for measuring a flow rate of a flow rate controller that controls a fluid flowing from a fluid supply source, wherein a build-up tank provided with an inner volume is disposed on a downstream of the flow rate controller, and a first inlet side on-off valve and a first outlet side on-off valve are disposed on an inlet side and on an outlet side respectively of the build-up tank, and a gas pressure detector and a temperature detector are disposed inside the build-up tank, and the method comprises the steps of:
    (a) making gas flow into the build-up tank by opening the first inlet side on-off valve and the first outlet side on-off valve in a state where a fluid flows from the flow rate controller;
    (b) measuring a first gas pressure $P_0$ and a first gas temperature $T_0$ after the gas flows into the build up tank;
    (c) filling the gas into the build-up tank by closing only the first outlet side on-off valve at a time $t_0$;
    (d) closing the first inlet side on-off valve at a time $t_1$;
    (e) keeping the first inlet side on-off valve and the first outlet side on-off valve closed until a time $t_2$ after the time $t_1$;
    (f) measuring a second gas temperature $T_2$ and a second gas pressure $P_2$ at the time $t_2$ when a gas temperature inside the build-up tank after closing of the first inlet side on-off valve becomes essentially the first gas temperature $T_0$ inside the build-up tank before closing of the first inlet side on-off valve while the first inlet side on-off valve and the first outlet side on-off valve are closed; and
    (g) arithmetically calculating a gas flow rate Q, based on respective measurement results, as $Q=(22.4V/R \cdot 40 \times (P_2/T_2 - P_0/T_0))$, wherein V is the inner volume of the build-up tank, R is a gas constant, and $\Delta t$ is a build-up time $t_1 - t_0$.

* * * * *

UNITED STATES PATENT AND TRADEMARK OFFICE
CERTIFICATE OF CORRECTION

PATENT NO. : 9,638,560 B2
APPLICATION NO. : 13/813219
DATED : May 2, 2017
INVENTOR(S) : Masaaki Nagase et al.

Page 1 of 1

It is certified that error appears in the above-identified patent and that said Letters Patent is hereby corrected as shown below:

In the Claims

Column 18, Lines 5-6, the formula should appear as follows:
$Q = (22.4V/R \cdot \Delta t) \times (P_2/T_2 - P_0/T_0)$ Column 18, Lines 49-50, the formula should appear as follows:
$Q = (22.4V/R \cdot \Delta t) \times (P_2/T_2 - P_0/T_0)$ Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*